(12) United States Patent
Miyawaki et al.

(10) Patent No.: US 9,176,453 B2
(45) Date of Patent: Nov. 3, 2015

(54) REDUCTION GEAR UNIT AND IMAGE FORMING APPARATUS INCORPORATING SAME

(75) Inventors: Katsuaki Miyawaki, Kanagawa (JP); Hiromichi Matsuda, Kanagawa (JP); Tetsuo Watanabe, Kanagawa (JP); Nobuo Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1036 days.

(21) Appl. No.: 13/207,739

(22) Filed: Aug. 11, 2011

(65) Prior Publication Data

US 2012/0046142 A1   Feb. 23, 2012

(30) Foreign Application Priority Data

Aug. 19, 2010   (JP) .................................. 2010-184380
Jun. 16, 2011   (JP) .................................. 2011-134001

(51) Int. Cl.
*F16H 57/08*   (2006.01)
*G03G 15/00*   (2006.01)

(52) U.S. Cl.
CPC ............ *G03G 15/757* (2013.01); *F16H 57/082* (2013.01); *G03G 2215/0129* (2013.01)

(58) Field of Classification Search
CPC ............................. F16H 57/082; G03G 15/757
See application file for complete search history.

(56) References Cited

U.S. PATENT DOCUMENTS

| | | | | |
|---|---|---|---|---|
| 4,926,715 | A | * | 5/1990 | Hirt et al. ....................... 475/337 |
| 2008/0145102 | A1 | * | 6/2008 | Katoh et al. ................... 475/331 |

FOREIGN PATENT DOCUMENTS

| | | |
|---|---|---|
| CN | 1131061 A | 9/1996 |
| CN | 101025219 A | 8/2007 |
| CN | 101046242 A | 10/2007 |
| CN | 101639114 A | 2/2010 |
| JP | 59-500626 A | 4/1984 |
| JP | 01-146043 U | 10/1989 |
| JP | 2001-173733 | 6/2001 |
| JP | 2002-242998 A | 8/2002 |
| JP | 2006-307909 | 11/2006 |

(Continued)

OTHER PUBLICATIONS

"P80A-Datasheet", http://banebots.com/docs/P80A-DATASHEET.pdf.*
"Internet Archive Wayback Machine", https://web.archive.org/web/20100701000000*/http://banebots.com/docs/P80A-DATASHEET.pdf.*
Office Action and Search Report issued Oct. 8, 2013 in Chinese Patent Application No. 201110234227.9.

(Continued)

*Primary Examiner* — Derek D Knight
(74) *Attorney, Agent, or Firm* — Oblon, McClelland, Maier & Neustadt, L.L.P.

(57) ABSTRACT

A reduction gear unit incorporatable in an image forming apparatus includes planetary gear mechanisms each including a sun gear, an outer gear, planetary gears arranged between the outer gear and the sun gear at equal intervals and meshing with the sun gear and the outer gear, and a carrier rotatable coaxially with the sun gear and the outer gear to rotatably support the planetary gears. An extreme upstream mechanism in the drive transmission direction includes an input element connected to a drive source. An extreme downstream mechanism includes an output element connected to a member outputting the drive force to a rotary member. Any mechanism other than the extreme downstream mechanism includes an output element connected to an input element of an adjacent mechanism located downstream of any other mechanism. The sun gear of the extreme downstream mechanism has a larger pitch diameter than any other mechanisms.

18 Claims, 4 Drawing Sheets

(56) References Cited

FOREIGN PATENT DOCUMENTS

| | | |
|---|---|---|
| JP | 2008-151868 | 7/2008 |
| JP | 2010-19271 A | 1/2010 |

OTHER PUBLICATIONS

JP Office Action issued on Mar. 6, 2015 in Japanese Patent Application No. 2011-134001.

* cited by examiner

REDUCTION GEAR UNIT AND IMAGE FORMING APPARATUS INCORPORATING SAME

CROSS-REFERENCE TO RELATED APPLICATIONS

This patent application is based on and claims priority pursuant to 35 U.S.C. §119 to Japanese Patent Application No. 2010-184380, filed on Aug. 19, 2010, in the Japan Patent Office, and Japanese Patent Application No. 2011-134001, filed on Jun. 16, 2011 in the Japan Patent Office, the entire disclosures of which are hereby incorporated herein by reference.

FIELD OF THE INVENTION

The present invention relates to a reduction gear unit and an image forming apparatus incorporating the reduction gear unit.

BACKGROUND OF THE INVENTION

In an image forming apparatus including an image carrying member, such as a photoconductor, image formation is performed with processes such as charging, exposure, development, and transfer performed on the image carrying member as the image carrying member rotates. In such an image forming apparatus, a drive source, such as a motor, is provided to drive the image carrying member to rotate. In general, the number of rotations of the drive source exceeds the number of rotations required for the rotation of the image carrying member. Therefore, reduction gear units have been used that transmit the drive force of the drive source to the image carrying member while reducing the rotation speed of the drive source with the use of a planetary gear speed reduction mechanism.

The planetary gear speed reduction mechanism includes a sun gear, an outer gear arranged coaxially with the sun gear, a plurality of planetary gears meshing with the sun gear and the outer gear, and a planetary carrier rotatably supporting the planetary gears and rotatably supported coaxially with the sun gear and the outer gear. The planetary gear speed reduction mechanism has three elements, i.e., the rotation of the sun gear, the revolution of the planetary gears (i.e., rotation of the planetary carrier), and the rotation of the outer gear, one of which is connected to a fixed member, another one of which is connected to an input member, and the remaining one of which is connected to an output member. It is possible to obtain different speed reduction ratios or set the rotation direction of the output shaft opposite to the rotation direction of the input shaft, depending on the combination of the three elements and the fixed, input, and output members.

In recent years, in image forming apparatuses in particular, polymerized toner has been used in many cases to improve image quality. As a consequence, the load applied to the image carrying member by a cleaning blade and so forth has been increasing. To counteract that effect, it is therefore conceivable to increase the output torque by increasing the speed reduction ratio with the use of a compound planetary gear reduction gear unit including a plurality of stages of planetary gear speed reduction mechanisms having the above-described configuration. It is common, in the compound planetary gear reduction gear unit, to use standardized outer gears, planetary gears, and sun gears at the respective stages to reduce costs.

The compound planetary gear reduction gear unit is, however, subjected to load torque of the load imposed by the cleaning blade and so forth on the rotary image carrying member. The thus-applied load torque is greatest at the planetary gear speed reduction mechanism at the extreme downstream stage in the drive transmission direction (hereinafter referred to as the final stage). As a result, the force generated by the load torque is greatest at the meshing portions of the gears in the planetary gear speed reduction mechanism at the final stage. In particular, the force generated by the load torque is greatest at the meshing portions of the sun gear at the rotation center and the planetary gears.

More specifically, where F represents the force generated by the load torque and applied to the meshing portions of the sun gear and the planetary gears, N represents the load torque, and r represents the pitch diameter of the sun gear, the equation $F=N/(r/2)$ holds. Meanwhile, the outer gear is larger in pitch diameter than the sun gear. Therefore, the force generated by the load toque and applied to the meshing portions of the outer gear and the planetary gears is lower than the force applied to the meshing portions of the sun gear and the planetary gears. The force generated by the load torque is thus greater at the meshing portions of the sun gear and the planetary gears in the planetary gear speed reduction mechanism at the final stage. As a result, the sun gear and the planetary gears tend to wear out prematurely.

BRIEF SUMMARY OF THE INVENTION

The present invention describes a novel reduction gear unit. In one example, a novel reduction gear unit includes a plurality of planetary gear mechanisms arranged in series in the axial direction thereof. Each of the planetary gear mechanisms includes a sun gear, an outer gear, a plurality of planetary gears, and a carrier. The outer gear is arranged coaxially with the sun gear. The planetary gears are arranged between the outer gear and the sun gear at equal intervals in a circumferential direction thereof and mesh with the sun gear and the outer gear. The carrier is rotatable coaxially with the sun gear and the outer gear to rotatably support the planetary gears. An extreme upstream planetary gear mechanism of the plurality of planetary gear mechanisms in a drive transmission direction includes an input element connected to a drive source. An extreme downstream planetary gear mechanism of the plurality of planetary gear mechanisms in the drive transmission direction includes an output element connected to a member for outputting the drive force to a rotary member. Any planetary gear mechanism of the plurality of planetary gear mechanisms than the extreme downstream planetary gear mechanism includes an output element connected to an input element of an adjacent planetary gear mechanism located downstream of any planetary gear mechanism in the drive transmission direction. The sun gear of the extreme downstream planetary gear mechanism in the drive transmission direction has a larger pitch diameter than the sun gear of any other planetary gear mechanism.

The sun gear of the extreme upstream planetary gear mechanism in the drive transmission direction may be continuous with and formed directly from a drive shaft of the drive source. The planetary gear mechanisms may share the same outer gear. Each of the planetary gear mechanisms may further include support shafts to support the planetary gears in the carrier that are made of metal.

Components of the planetary gear mechanism other than the support shafts may be made of resin.

The number of the planetary gears in the extreme downstream planetary gear mechanism in the drive transmission direction may be greater than the number of the planetary gears in any other planetary gear mechanism.

The extreme downstream planetary gear mechanism may have four planetary gears and any other planetary gear mechanism may have three planetary gears.

The above-described reduction gear unit may further include a casing that enables the carriers of the planetary gear mechanisms to float rotatably therewithin.

In each of the planetary gear mechanisms, the outer gear may be non-rotatable, and the drive force may be input to the sun gear and output to the carrier.

The above-described reduction gear unit may further include an output shaft to output the drive force to the rotary member. The output shaft may be fixedly mounted on the carrier of the extreme downstream planetary gear mechanism in the drive transmission direction, and the sun gear of an adjacent planetary gear mechanism located downstream of the any other planetary gear mechanism in the drive transmission direction may be fixedly mounted on the carrier of any other planetary gear mechanism.

The pitch diameter of the sun gear of the extreme downstream planetary gear mechanism in the drive transmission direction may have a larger pitch diameter than the diameter of a shaft of the rotary member.

The above-described reduction gear unit may further include an output shaft to output the drive force to the rotary member. The output shaft may be mounted on the carrier of the extreme downstream planetary gear mechanism in the drive transmission direction and coupled to a shaft of the rotary member by a splined coupling.

The present invention further describes a novel image forming apparatus. In one example, a novel image forming apparatus includes a rotary member, a drive source configured to drive the rotary member, and the above-described reduction gear unit that transmits the rotational drive force of the drive source to the rotary member while reducing the rotation speed of the drive source.

BRIEF DESCRIPTION OF THE SEVERAL VIEWS OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF THE INVENTION

Figure 1:
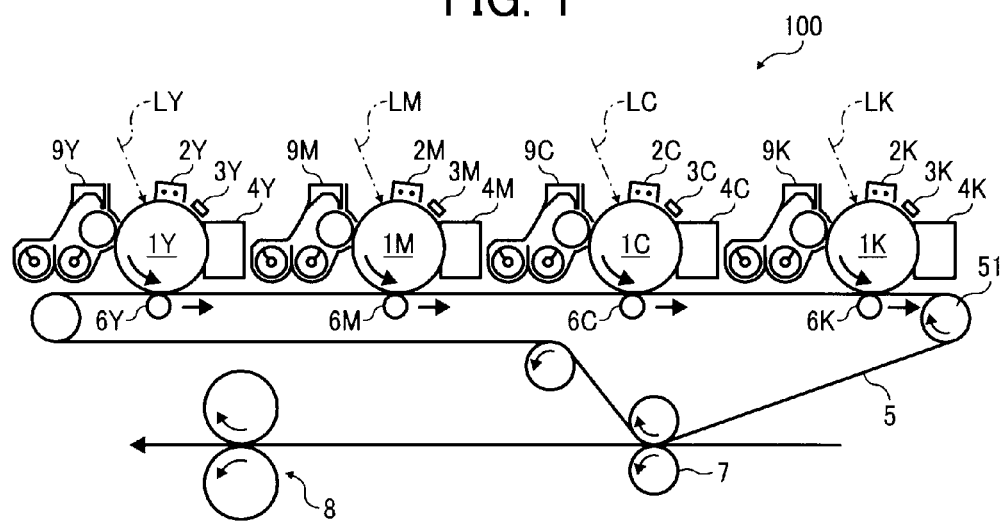
FIG. 1 is an overall schematic diagram of an image forming unit in an example of a copier according to an embodiment of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to the present invention. Elements having the same functions and shapes are denoted by the same reference numerals throughout the specification and redundant descriptions are omitted. Elements that do not require descriptions may be omitted from the drawings as a matter of convenience. Reference numerals of elements extracted from the patent publications are in parentheses so as to be distinguished from those of exemplary embodiments of the present invention.

The present invention includes a technique applicable to any image forming apparatus, and is implemented in the most effective manner in an electrophotographic image forming apparatus.

In describing preferred embodiments illustrated in the drawings, specific terminology is employed for the sake of clarity. However, the disclosure of the present invention is not intended to be limited to the specific terminology so selected and it is to be understood that each specific element includes all technical equivalents that operate in a similar manner.

Referring now to the drawings, wherein like reference numerals designate identical or corresponding parts throughout the several views, description will be made of an embodiment of the present invention applied to an electrophotographic color copier 100 (hereinafter referred to as the copier 100) serving as an image forming apparatus. The copier 100 according to the present embodiment is a so-called tandem-type image forming apparatus according to a dry two-component development method using a dry two-component developer.

FIG. 1 is an overall schematic diagram of an image forming unit in the copier 100 according to the present embodiment. The copier 100 performs an image forming operation by receiving image data, i.e., image information, from an image reading unit. As illustrated in FIG. 1, the copier 100 includes photoconductor drums 1Y, 1M, 1C, and 1K, an intermediate transfer belt 5, a drive roller 51, chargers 2Y, 2M, 2C, and 2K, development devices 9Y, 9M, 9C, and 9K for the respective colors, cleaning devices 4Y, 4M, 4C, and 4K, discharging lamps 3Y, 3M, 3C, and 3K, primary transfer rollers 6Y, 6M, 6C, and 6K, a secondary transfer roller 7, a pair of fixing rollers 8, and so forth. In the following description, the suffixes Y, M, C, and K, which represent the colors of yellow, magenta, cyan, and black, respectively, may be omitted where the distinction therebetween is unnecessary.

The four photoconductor drums 1Y, 1M, 1C, and 1K arranged in a line are latent image carrying members serving as rotary members for yellow, magenta, cyan, and black (hereinafter referred to as Y, M, C, and K, respectively) colors. The photoconductor drums 1Y, 1M, 1C, and 1K are arranged in a line in the moving direction of the endless belt-like intermediate transfer belt 5 to be in contact with the intermediate transfer belt 5. The intermediate transfer belt 5 is supported by a plurality of rotatable rollers including the drive roller 51. Further, the photoconductor drums 1Y, 1M, 1C, and 1K are surrounded by electrophotographic processing members, such as the chargers 2Y, 2M, 2C, and 2K, the development devices 9Y, 9M, 9C, and 9K, the cleaning devices 4Y, 4M, 4C, and 4K, and the discharging lamps 3Y, 3M, 3C, and 3K, which are arranged in processing order. The photoconductor drum 1, the charger 2, the discharging lamp 3, the cleaning device 4, and the development device 9 for the same color are integrally formed as a process cartridge that is removably installable in the body of the copier 100.

Figure 2:
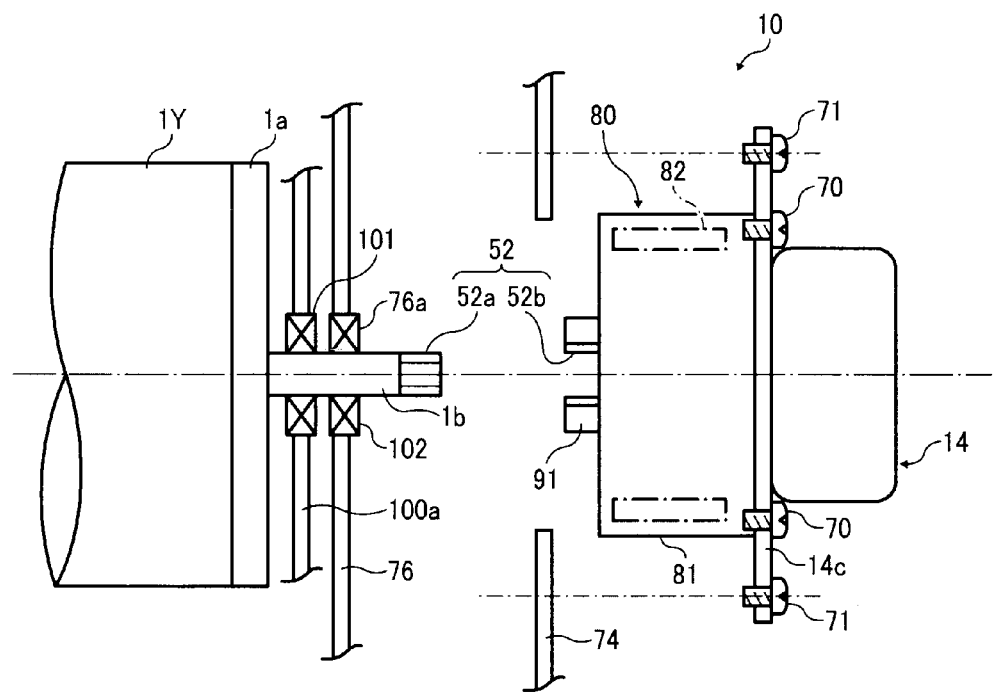
FIG. 2 is a schematic diagram illustrating attachment of a photoconductor drive device to the copier.

To form a full-color image in the copier 100 according to the present embodiment, a later-described photoconductor drive device 10 as illustrated in FIG. 2 first drives the photoconductor drum 1Y to rotate in the direction indicated by the corresponding arrow in FIG. 1. The thus rotated photoconductor drum 1Y is uniformly charged by the charger 2Y, and is applied with a light beam LY (light beams LM, LC, and LK are for the photoconductor drums 1M, 1C, and 1K, respectively) from an optical writing device so that a Y electrostatic latent image can be formed on the photoconductor drum 1Y. The Y electrostatic latent image is developed by the development device 9Y with a Y toner contained in a developer. In the development, a predetermined development bias voltage is applied between a development roller of the development device 9Y and the photoconductor drum 1Y, and therefore the Y toner on the development roller is electrostatically attracted to the Y electrostatic latent image on the photoconductor drum 1Y. Thus, the Y electrostatic latent image is developed into a Y toner image.

As the photoconductor drum 1Y rotates, the thus formed Y toner image is conveyed to a primary transfer position at which the photoconductor drum 1Y and the intermediate transfer belt 5 make contact with each other. At the primary transfer position, the inner surface of the intermediate transfer belt 5 is applied with a predetermined bias voltage by the primary transfer roller 6Y. Then, a primary transfer electric field is generated by the application of the bias voltage, and attracts the Y toner image on the photoconductor drum 1Y toward the intermediate transfer belt 5, and thus, the Y toner image is primary-transferred onto the intermediate transfer belt 5. Thereafter, an M toner image, a C toner image, and a K toner image are similarly sequentially primary-transferred onto the Y toner image on the intermediate transfer belt 5 to be superimposed upon one another.

As the intermediate transfer belt 5 rotates, the toner images of the four colors thus superimposed on the intermediate transfer belt 5 are conveyed to a secondary transfer position facing the secondary transfer roller 7. Further, a transfer sheet serving as a recording medium is conveyed at a predetermined time to the secondary transfer position by a pair of registration rollers. Then, at the secondary transfer position, the rear surface of the transfer sheet is applied with a predetermined bias voltage by the secondary transfer roller 7. With a secondary transfer electric field generated by the application of the bias voltage and contact pressure applied at the secondary transfer position, the toner images on the intermediate transfer belt 5 are secondary-transferred onto the transfer sheet at the same time. Thereafter, the transfer sheet having the toner images secondary-transferred thereto is subjected to a fixing by the pair of fixing rollers 8, and is discharged outside the copier 100.

Subsequently, a description is given of the photoconductor drive device 10, which is a drive device including a planetary gear reduction gear unit serving as a reduction gear unit.

If the speed of a photoconductor drum changes, jitter or density irregularity occurs in an output image. If the change in speed of a photoconductor drum continues at a certain frequency, periodical density irregularity occurs in the entire image, and is visually observed as striped banding. The change in speed of the photoconductor drum causes a shift in the sub-scanning position of an exposure line of a writing system. At the same time, a shift in the sub-scanning position occurs in the primary-transfer of the toner image onto a transfer belt.

A drive transmission unit for the photoconductor drum, which is required to perform highly accurate driving operation as described above, uses plastic gears molded by injection molding using a molten resin. A plastic gear is superior to a metal gear for a self-lubricating property, lower noise produced when in use, a lighter weight, and higher corrosion resistance and greater mass-producibility. Meanwhile, the plastic gear is inferior to the metal gear in terms of durability, i.e., abrasion resistance, rigidity, and accuracy. To attain high durability and rigidity even with the use of plastic gears, application of a planetary gear device to a reduction gear unit has been proposed. The planetary gear device includes a sun gear and an outer gear arranged coaxially and a plurality of planetary gears meshing with both the sun gear and the outer gear. The planetary gears are rotatably supported by a planetary carrier, and are rotatable and revolvable around the sun gear. The rotational load of an output shaft is dispersedly transmitted by the plurality of planetary gear, and therefore the planetary gear device is higher in durability and transfer stiffness than a gear device using a gear train, and attains a reduction in gear size. For example, it is possible to attain a substantial reduction in size by placing, inside the cylindrical body of the photoconductor drum, a compact drive mechanism and a motor serving as a drive source.

In a reduction gear unit for a photoconductor drum of a copier or printer, an outer-rotor direct current (DC) brushless motor is commonly used as the drive motor of a gear train speed reduction system in view of the required specifications of the rotation accuracy and the rotation speed. The motor is used at a rotation number in a range of from approximately 1000 rpm (rotations per minute) to approximately 2500 rpm. In consideration of the efficiency of the outer-rotor DC brushless motor, however, it is desirable to set the rotation number in a range of from approximately 3000 rpm to approximately 5000 rpm. Further, the diameter of a motor shaft of the outer-rotor DC brushless motor is approximately 6 mm. If the diameter of the motor shaft of the outer-rotor DC brushless motor exceeds approximately 6 mm, a stepped shaft is processed such that the gear formed on the motor shaft has a diameter of approximately 6 mm. The outer rotor diameter of the motor is in a range of from approximately 40 mm to approximately 60 mm, and the speed reduction ratio of the reduction gear unit is in a range of from approximately 1/15 to approximately 1/20. The diameter of many photoconductor drums is in a range of from approximately 30 mm to approximately 60 mm.

Meanwhile, in a common 2K-H planetary gear reduction gear unit, the input shaft thereof is connected to the sun gear, the output shaft transmitting the speed-reduced rotation is connected to the planetary carrier, and the outer gear is non-rotatably fixed to the casing. Further, the plurality of planetary gears are rotatably supported by the planetary carrier, and mesh with the sun gear and the outer gear. Further, the maximum speed reduction ratio is approximately 1/10. If a two-stage 2K-H planetary gear speed reduction mechanism is used, however, it is possible to easily set the speed reduction ratio of the reduction gear unit to a range of from approximately 1/20 to approximately 1/40, and thus to use the motor at a rotation number realizing relatively high motor efficiency. Further, it is known that a planetary gear device is driven with the load distributed to a plurality of planetary gears, and that a planetary gear device having three planetary gears attains equal distribution of the load and relatively high rotation accuracy. Further, if the outer diameter of the planetary gear device is set substantially equal to or smaller than the outer diameter of the motor and the outer diameter of the photoconductor drum, the advantage of reduction in size is exerted.

In such a planetary gear reduction gear unit including a plurality of stages of planetary gear mechanisms, however, the load torque of the photoconductor drum is applied to the planetary gear mechanism at the final stage. In particular, the force generated by the load torque is greatest at the meshing portions of the sun gear located at the rotation center and the planetary gears in the planetary gear mechanism at the final stage. Therefore, the sun gear and the planetary gears of the planetary gear mechanism at the final stage are worn out and reach the end of the life at a relatively early stage. In view of this, the present embodiment can prevent the sun gear and the planetary gears from reaching the end of the life at a relatively early stage, even if the load torque is applied to the planetary gear mechanism at the final stage.

With reference to FIGS. 2 to 8, a specific description is given of the configuration of a photoconductor drive device 10. Since the photoconductor drums 1Y, 1M, 1C, and 1K are driven to rotate by the respective photoconductor drive devices 10 of the same configuration, the following description will be made of the photoconductor drive device 10 for the photoconductor drum 1Y.

FIG. 2 is a schematic diagram illustrating attachment of the photoconductor drive device 10 to the copier 100. The left side of FIG. 2 illustrates the photoconductor drum 1Y, a drum flange 1a, a drum shaft 1b, a process cartridge side plate 100a, a first drum shaft bearing 101, a second drum shaft bearing 102, a body side plate 76, a fitting portion 76a, and an inner gear 52a. The disc-like drum flange 1a is fixed to an end portion of the photoconductor drum 1Y in the axis direction to seal an end surface of the photoconductor drum 1Y in the axial direction. The drum shaft 1b is fixed at the center of the drum flange 1a. The drum shaft 1b is rotatably supported by the first drum shaft bearing 101 provided to the process cartridge side plate 100a of the process cartridge housing the photoconductor drum 1Y, the charger 2Y, the development device 9Y, the cleaning device 4Y, the discharging lamp 3Y, and so forth. The second drum shaft bearing 102 is fixed to the drum shaft 1b, and the body side plate 76 is provided with the relatively shallow fitting portion 76a into which the second drum shaft bearing 102 is inserted. The leading end of the drum shaft 1b is formed with the spline-like inner gear 52a, which fits in a spline-line outer gear 52b provided on the inner circumferential surface of a cylindrical shaft 91 serving as the output shaft of the later-described photoconductor drive device 10. The inner gear 52a and the outer gear 52b form a splined coupling 52. Further, although not illustrated in the drawings, either one of the process cartridge and the body side plate 76 is provided with a positioning pin, and the other one of the process cartridge and the body side plate 76 is provided with a positioning hole into which the positioning pin is inserted.

The process cartridge is attachable to and detachable from the body side plate 76. In the attachment of the process cartridge to the body side plate 76, the process cartridge is guided to a predetermined location by a race guide. Then, the second drum shaft bearing 102 is inserted into the fitting portion 76a of the body side plate 76, and the positioning pin is inserted into the positioning hole. By so doing, the process cartridge is positioned relative to the body of the copier 100. The second drum shaft bearing 102 and the body side plate 76 are fit in a spigot-and-socket fashion. With this configuration, the coaxiality accuracy of the photoconductor drum 1Y and a later-described planetary gear reduction gear unit 80 of the photoconductor drive device 10 is ensured.

The right side of FIG. 2 illustrates the photoconductor drive device 10, which includes a motor 14 serving as a drive source and the planetary gear reduction gear unit 80 serving as a reduction gear unit. The photoconductor drive device 10 is fixed to a drive side plate 74 by drive device fixing screws 71. The photoconductor drive device 10 illustrated in FIG. 2 also includes an outer gear fixing housing 81, an outer gear 82, outer gear fixing screws 70, and a fixing flange 14c.

Figure 3:
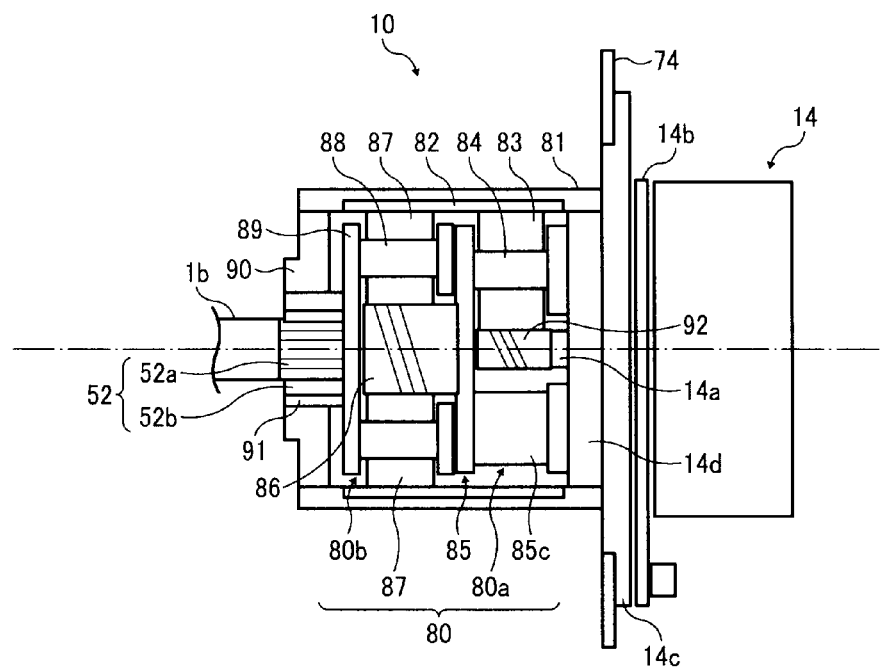
FIG. 3 is a cross-sectional view of the photoconductor drive device.

FIG. 3 is a cross-sectional view of the photoconductor drive device 10. The motor 14 is a DC brushless motor including the fixing flange 14c. A surface of the fixing flange 14c facing the planetary gear reduction gear unit 80 includes a projecting portion 14d projecting toward the photoconductor drum 1Y. The cylindrical outer gear fixing housing 81 of the planetary gear reduction gear unit 80 fits on the projecting portion 14d to be positioned. Further, as illustrated in FIG. 2, the outer gear fixing housing 81 is fixed to the fixing flange 14c of the motor 14 by the outer gear fixing screws 70. Further, an end cap 90 is fixed to an end portion of the outer gear fixing housing 81 on the side of the photoconductor drum 1Y. Meanwhile, the other surface of the fixing flange 14c of the motor 14 opposite to the surface facing the planetary gear reduction gear unit 80 is provided with a stator iron core, a motor drive circuit substrate 14b, and so forth. A motor shaft 14a of the motor 14 supported by two shaft bearings provided to the fixing flange 14c pierces through the fixing flange 14c with the leading end thereof located inside the outer gear fixing housing 81. Supporting the motor shaft 14a, the fixing flange 14c supports an outer rotor serving as the rotator of the DC brushless motor. The fixing flange 14c and the outer gear fixing housing 81, which are configured as separate members in the present embodiment, may be integrally formed. The fixing flange 14c includes a metal plate having a thickness of approximately 5 mm to obtain sufficient strength.

The planetary gear reduction gear unit 80 of the present embodiment includes a compound planetary gear mechanism including two stages of 2K-H planetary gear speed reduction mechanisms. A 2K-H planetary gear speed reduction mechanism is formed by four types of components, i.e., a sun gear, planetary gears, a planetary carrier for supporting the orbital motion of the planetary gears, and an outer gear. The planetary gear speed reduction mechanism has three elements, i.e., the rotation of the sun gear, the revolution of the planetary gears (i.e., rotation of the planetary carrier), and the rotation of the outer gear, one of which is connected to a fixed member, another one of which is connected to an input member, and the remaining one of which is connected to an output member. It is possible to switch between a plurality of speed reduction ratios or rotation directions with a single planetary gear speed reduction mechanism, depending on the combination of the three elements and the fixed, input, and output members. In a compound planetary gear mechanism including a plurality of stages of 2K-H planetary gear speed reduction mechanisms, the planetary gear speed reduction mechanism located closest to a motor, i.e., located extreme upstream in the drive transmission direction, has three basic shafts. One of the three basic shafts is coupled to a basic shaft of the adjacent planetary gear speed reduction mechanism located downstream of the extreme upstream planetary gear speed reduction mechanism in the drive transmission direction. Further, another one of the three basic shafts is provided to a motor shaft serving as the input shaft, and the remaining one of the three basic shafts is fixed. Further, the planetary gear speed reduction mechanism located closest to a rotary member, i.e., located extreme downstream in the drive transmission direction, has three basic shafts. One of the three basic shafts is coupled to a basic shaft of the adjacent planetary gear speed reduction mechanism located upstream of the extreme downstream planetary gear speed reduction mechanism in the drive transmission direction. Further, another one of the three basic shafts is provided to the output shaft, and the remaining one of the three basic shafts is fixed. Further, any planetary gear speed reduction mechanism located between other planetary gear speed reduction mechanisms has three basic shafts, two of which are coupled together, and the remaining one of which is fixed. The compound planetary gear mechanism of the present embodiment includes two stages of 2K-H planetary gear speed reduction mechanisms. Therefore, the compound planetary gear mechanism of the present embodiment includes the configuration of the planetary gear speed reduction mechanism located closest to the motor, i.e., located extreme upstream in the drive transmission direction, and the configuration of the planetary gear speed reduction mechanism located closest to the rotary member, i.e., located extreme downstream in the drive transmission direction, which have been described above. Further, in the planetary gear speed reduction mechanism at each of the stages in the compound planetary gear mechanism of the present embodiment, the outer gear is fixed, the sun gear is used for input, and the planetary carrier is used for output.

Returning back to FIG. 3, the planetary gear reduction gear unit 80 includes a plurality of planetary gear mechanism including a first-stage planetary gear mechanism 80a and a second-stage planetary gear mechanism 80b. The first-stage planetary gear mechanism 80a serves as a upstream or extreme upstream planetary gear mechanism in the drive transmission direction and the second-stage planetary gear mechanism 80b serves as a downstream or extreme downstream planetary gear mechanism in the drive transmission direction, for example.

The first-stage planetary gear mechanism 80a located on the side of the motor 14 includes a first sun gear 92, which is formed by gear cutting directly performed on the leading end of the motor shaft 14a of the motor 14 serving as the input shaft. First planetary gears 83, which mesh with the first sun gear 92 and an outer gear 82 provided in the outer gear fixing housing 81, are supported by a first carrier 85 to revolve around the outer circumference of the first sun gear 92. The first planetary gears 83 are disposed at three locations around the same axis to attain rotational balance and torque distribution. In the present embodiment, the first planetary gears 83 are disposed at three positions spaced at equal intervals in the circumferential direction. The first planetary gears 83 rotate while being rotatably supported by first carrier pins 84 provided in the first carrier 85. Meshing with the first sun gear 92 and the outer gear 82, the first planetary gears 83 perform rotation and revolution. The first carrier 85 supporting the first planetary gears 83 rotates at a lower speed than the rotation speed of the first sun gear 92, thereby obtaining the speed reduction ratio at the first stage.

At the rotation center of the first carrier 85, a second sun gear 86 of the second-stage planetary gear mechanism 80b is provided. The second sun gear 86 serves as the input member of the second-stage planetary gear mechanism 80b. The first carrier 85 is rotatably floatingly supported in the planetary gear reduction gear unit 80. The second sun gear 86 has a larger pitch diameter than the first sun gear 92. Second planetary gears 87, which mesh with the second sun gear 86 and the outer gear 82 shared by the first-stage planetary gear mechanism 80a provided in the outer gear fixing housing 81, are supported by a second carrier 89 to revolve around the outer circumference of the second sun gear 86. In the present embodiment, the second planetary gears 87 are disposed at four positions spaced at equal intervals in the circumferential direction. The number of the second planetary gears 87 is larger than the number of the first planetary gears 83 in the first-stage planetary gear mechanism 80a. The second planetary gears 87 rotate while being rotatably supported by second carrier pins 88 provided in the second carrier 89. The second carrier 89 at the second stage corresponding to the final stage is provided with the cylindrical shaft 91 serving as the output shaft. The inner circumferential surface of the cylindrical shaft 91 is formed with the spline-like outer gear 52b. The outer gear 52b and the spline-like inner gear 52a at the leading end of the drum shaft 1b form the splined coupling 52. With the inner gear 52a and the outer gear 52b meshing with each other, the drum shaft 1b and the planetary gear reduction gear unit 80 are coupled together. The drum shaft 1b and the cylindrical shaft 91 serving as the output shaft of the planetary gear reduction gear unit 80 are thus coupled together by the splined coupling 52. Therefore, the drum shaft 1b is separated from the cylindrical shaft 91 simply by drawing the process cartridge from the body side plate 76 in the axial direction of the photoconductor drum 1Y. Accordingly, the drum shaft 1b is coupled to and separated from the cylindrical shaft 91 with relative ease.

The drive force of the motor 14 is transmitted from the motor shaft 14a to the first sun gear 92, and the first sun gear 92 is driven to rotate. In accordance with the rotation of the first sun gear 92, the drive force is transmitted to the three first planetary gears 83 meshing with the first sun gear 92, and the first planetary gears 83 rotate while revolving around the first sun gear 92. In accordance with the revolution of the first planetary gears 83, the drive force is transmitted to the first carrier 85 with the rotation speed reduced. By so doing, the first carrier 85 rotates and transmits the drive force to the second sun gear 86 provided thereto, and the second sun gear 86 rotates. Then, the drive force is transmitted to the four second planetary gears 87 meshing with the second sun gear 86, and the second planetary gears 87 rotate while revolving around the second sun gear 86. In accordance with the revolution of the second planetary gears 87, the drive force is transmitted to the second carrier 89 with the rotation speed reduced. Then, the drive force is transmitted to the photoconductor drum 1Y via the cylindrical shaft 91 provided to the second carrier 89 and the drum shaft 1b. Consequently, the photoconductor drum 1Y is rotated at a predetermined rotation number.

Figure 4A:
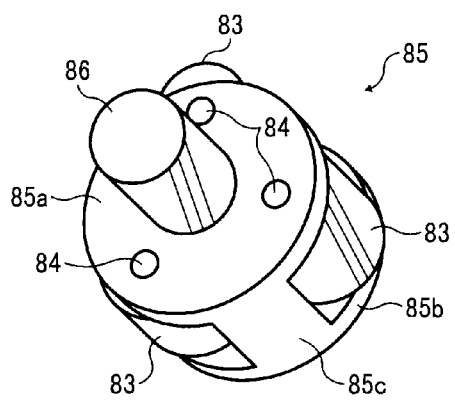
FIG. 4A is a perspective view of a first carrier.
Figure 4B:
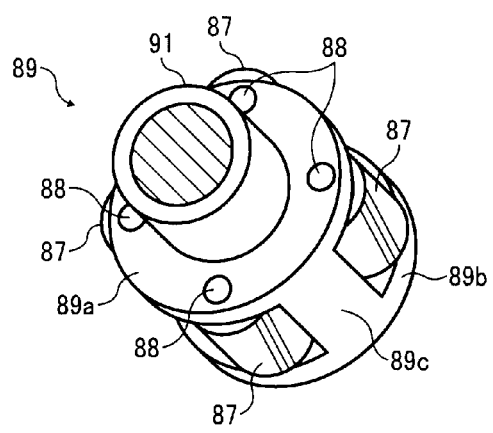
FIG. 4B is a perspective view of a second carrier.

FIG. 4A is a perspective view of the first carrier 85, and FIG. 4B is a perspective view of the second carrier 89.

As illustrated in FIG. 4A, the first carrier 85 includes two side plates of a first carrier side plate 85a and a second carrier side plate 85b supporting opposite end portions of the first carrier pins 84 supporting the first planetary gears 83. At the first stage, the three first planetary gears 83 are provided, and the first carrier side plate 85a and the second carrier side plate 85b are fixed by three carrier columns 85c provide between the first planetary gears 83. The revolution of the first planetary gears 83 results in the rotation of the first carrier 85 as a whole, and the rotation is transmitted to the second sun gear 86 formed coaxially and integrally with the first carrier side plate 85a.

As illustrated in FIG. 4B, the second carrier 89 is similar in configuration to the first carrier 85. Specifically, the second carrier 89 includes two side plates of a first carrier side plate 89a and a second carrier side plate 89b supporting opposite end portions of the second carrier pins 88 supporting the second planetary gears 87. Different from the first carrier 85, the second carrier 89 includes the four second planetary gears 87 and four carrier columns 89c. Further, the cylindrical shaft 91 is formed coaxially and integrally with the first carrier side plate 89a of the second carrier 89.

In each of the first carrier pins 84 and the second carrier pins 88, a radial load is generated to rotate a corresponding one of the first carrier 85 and the second carrier 89. If the first carrier pins 84 and the second carrier pins 88 are cantilever-supported, the first carrier pins 84 and the second carrier pins 88 tend to tilt owing to the radial load, and the tilt results in deterioration of the rotation transmission accuracy. The tilting of the carrier pins tends to occur particularly when a carrier side plate for fixing the carrier pins is made of resin. In the present embodiment, however, the first carrier pins 84 are supported by the first and second side plates 85a and 85b and the second carrier pins 88 are supported by the first and second side plates 89a and 89b. Therefore, the first carrier pins 84 and the second carrier pins 88 are prevented from tilting, even if made of a resin material, thereby minimizing deterioration of the rotation transmission accuracy.

The speed reduction ratio of the planetary gear reduction gear unit 80 is expressed by an equation:

$$(\text{Speed Reduction Ratio}) = Za1/(Za1+Zc1) * Za2/(Za2+Zc2),$$

where "Za" represents the number of the teeth of the sun gear, and "Zc" represents the number of the teeth of the outer gear. In the equation, the suffixes 1 and 2 represent the first-stage planetary gear mechanism 80a and the second-stage planetary gear mechanism 80b, respectively. As described in the equation, the speed reduction ratio of the planetary gear reduction gear unit 80 corresponds to the product of the speed reduction ratio of the first-stage planetary gear mechanism 80a and the speed reduction ratio of the second-stage planetary gear mechanism 80b. The motor 14 is effectively driven at a particular rotation number. The speed reduction ratio of the planetary gear reduction gear unit 80 is determined such that the motor 14 is driven at a rotation number allowing effective driving thereof.

In the present embodiment, if the pitch diameter of the second sun gear 86 is increased, the load torque applied to the meshing portions of the second sun gear 86 and the second planetary gears 87 can be reduced. The increase in the pitch diameter of the second sun gear 86, however, results in a reduction in the speed reduction ratio at the second stage. Therefore, the speed reduction ratio at the first stage needs to be increased to attain a speed reduction ratio with which the motor 14 is rotated at the rotation number allowing effective driving thereof. In the present embodiment, therefore, the pitch diameter of the first sun gear 92 is set smaller than the pitch diameter of the second sun gear 86 to increase the speed reduction ratio, and thus attain the speed reduction ratio with which the motor 14 is rotated at the rotation number allowing effective driving thereof. If the diameter of the outer gear 82 at the first stage is increased, it is possible to increase the speed reduction ratio at the first stage, without reducing the pitch diameter of the first sun gear 92. In this case, however, the shared use of the outer gear 82 at the first and second stages is prevented, which may result in an increase in the cost of the reduction gear unit 80. Further, the outer diameter of the first-stage planetary gear mechanism 80a exceeds the outer diameter of the motor 14 and the outer diameter of the photoconductor drum 1Y, and the advantage of reduction in size is not obtained.

As illustrated in FIG. 3 described above, the end cap 90 is fixed by screws to the end portion of the outer gear fixing housing 81 on the side of the photoconductor drum 1Y serving as a rotary member. The end cap 90 is provided to prevent the components in the outer gear fixing housing 81, such as the first carrier 85, the second carrier 89, the second sun gear 86, the first planetary gear 83, the second planetary gear 87, and the cylindrical shaft 91, from dropping out of the outer gear fixing housing 81 in the process of attaching the planetary gear reduction gear unit 80 to the drive side plate 74. There is a sufficient clearance between the end cap 90 and the cylindrical shaft 91 provided to the second carrier 89. Thus, the end cap 90 does not rotatably support the second carrier 89. With this configuration, the second carrier 89 is floatingly supported in the outer gear fixing housing 81.

Further, in the planetary gear reduction gear unit 80 of the present embodiment, the first sun gear 92 formed by gear cutting directly performed on the motor shaft 14a, the first carrier pins 84, and the second carrier pins 88 are made of a metal material, such as stainless steel or carbon steel, for example. Meanwhile, the other members such as the first planetary gears 83, the second planetary gears 87, the first carrier 85, the second carrier 89, the second sun gear 86, the cylindrical shaft 91, and the outer gear fixing housing 81 including the outer gear 82, are molded from a resin material, such as polyacetal, for example. Molding of the members from resin allows the members to be mass-produced by injection molding at relatively low cost. Further, if the gears of the planetary gear mechanisms excluding the first sun gear 92 are made of a resin material, the gears acquire a self-lubricating property. Further, such gears produce less noise when in use and are lighter in weight than gears made of metal, and moreover have improved corrosion resistance.

At the same time, however, gears made of resin are inferior in terms of durability (i.e., abrasion resistance) and rigidity to gears made of metal. In the second-stage planetary gear mechanism 80b receiving the load torque of photoconductor drum 1Y, the meshing portions of the second sun gear 86 and the second planetary gears 87 are subjected to a relatively high load generated by the load torque. In the present embodiment, however, the pitch diameter of the second sun gear 86 is increased, and therefore the load applied to the meshing portions of the second planetary gears 87 and the second sun gear 86 can be reduced below that of a configuration in which the pitch diameter of the second sun gear 86 is equal to the pitch diameter of the first sun gear 92. Accordingly, the second sun gear 86 and the second planetary gears 87 are prevented from wearing out prematurely, even if made of resin.

Figure 5:
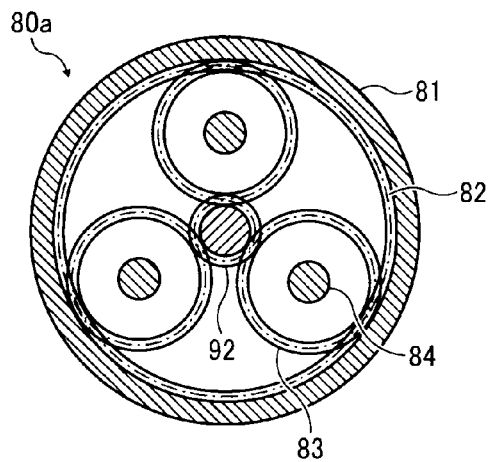
FIG. 5 is a transverse sectional view of a first-stage planetary gear mechanism.

FIG. 5 is a transverse sectional view of the first-stage planetary gear mechanism 80a. In FIG. 5, the carrier columns 85c are not illustrated.

Figure 6:
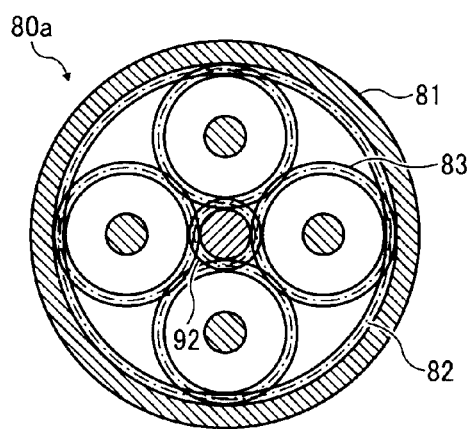
FIG. 6 is a diagram illustrating a case in which four planetary gears are provided in the first-stage planetary gear mechanism.

The first sun gear 92 is formed by gear cutting directly on the motor shaft 14a, and therefore the first sun gear 92 has an outer diameter of approximately 6 mm or less. The three first planetary gears 83 are arranged around the first sun gear 92 at equal intervals. The first sun gear 92 has a relatively small pitch diameter, and thus the distance between the first sun gear 92 and the outer gear 82 is increased. As a result, the first planetary gears 83 meshing with the first sun gear 92 and the outer gear 82 are increased in pitch diameter. As illustrated in FIG. 6, therefore, an attempt to arrange four first planetary gears 83 in the first-stage planetary gear mechanism 80a fails owing to the interference of the first planetary gears 83 with one another.

Figure 7:
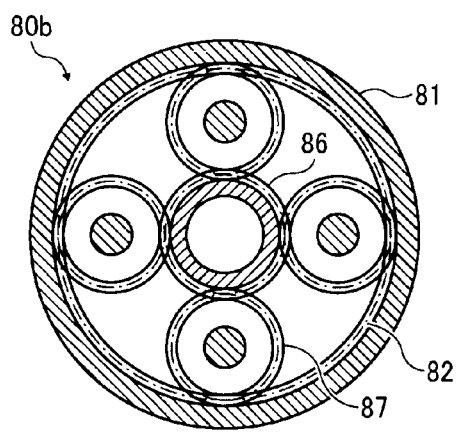
FIG. 7 is a transverse sectional view of a second-stage planetary gear mechanism.

FIG. 7 is a transverse sectional view of the second-stage planetary gear mechanism 80b. For convenience, the carrier columns 89c are not illustrated in FIG. 7.

The pitch diameter of the second sun gear 86 is set larger than the pitch diameter of the first sun gear 92, and therefore the distance between the second sun gear 86 and the outer gear 82 is less than the distance between the first sun gear 92 and the outer gear 82 in the first-stage planetary gear mechanism 80a. By so doing, the pitch diameter of the second planetary gears 87 is reduced to be smaller than the pitch diameter of the first planetary gears 83. Accordingly, the four second planetary gears 87 can be arranged at equal intervals in the second-stage planetary gear mechanism 80b without interfering with one another.

In the present embodiment, the second-stage planetary gear mechanism 80b at the final stage thus includes the four second planetary gears 87. Therefore, the load generated by the load torque and applied to each of the second planetary gears 87 is reduced to be lower than in a configuration including three second planetary gears 87. Accordingly, the second planetary gears 87 can be extended in life.

Further, in the present embodiment, the first carrier 85 and the second carrier 89 are rotatably floatingly supported, enabling self-alignment of the orbits of the first planetary gears 83 and the second planetary gears 87.

Figure 8:
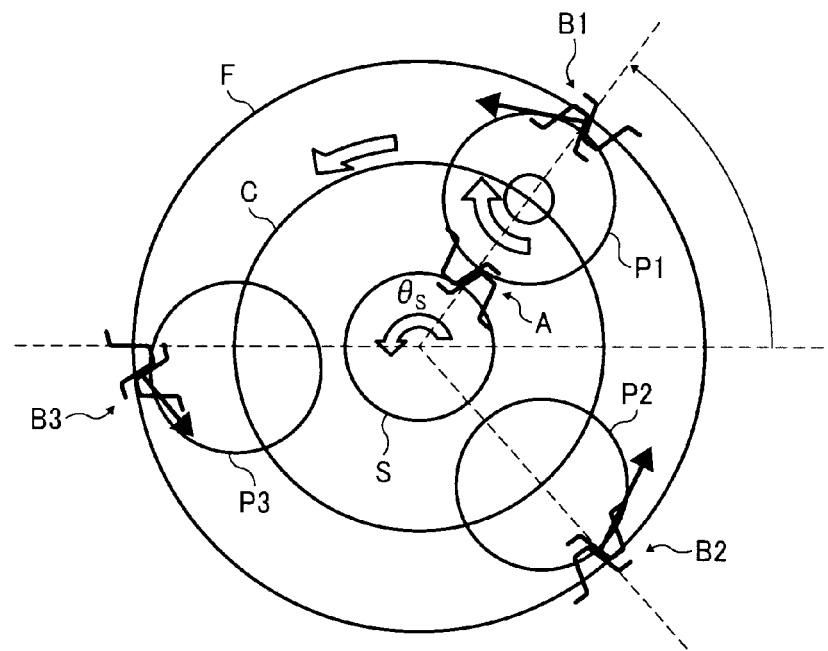
FIG. 8 is a diagram illustrating a model of meshing of an outer gear and planetary gears in a planetary gear mechanism.

FIG. 8 is an explanatory diagram illustrating a model of meshing of an outer gear and planetary gears in a planetary gear mechanism. When a sun gear S rotates in a counterclockwise direction in FIG. 8, the teeth of the sun gear S and the teeth of a planetary gear P1 mesh with each other such that the drive force is transmitted in the direction of clockwise rotation of the planetary gear P1, as in a portion indicated by reference sign A in FIG. 8. At the same time, the planetary gear P1 meshes with an outer gear F, as in a portion indicated by reference sign B1 in FIG. 8. In this state, the planetary gear P1 receives a tooth surface stress acting in the direction indicted by the corresponding arrow in FIG. 8. At the same time, as in respective portions indicated by reference signs B2 and B3 in FIG. 8, the other planetary gears P2 and P3 similarly receive respective tooth surface stresses in the directions indicated by the respective corresponding arrows in FIG. 8. The tooth surface stress varies depending on the difference in the state of meshing, which is caused by errors in gear form or attachment positioning of the outer gear F. Herein, if a carrier C is floatingly supported, the respective tooth surface stresses incline toward the center of the sun gear S in accordance with the contact pressure angle of the meshing gears. Therefore, the carrier C automatically moves to the position at which the tooth surface stresses are equalized. With this action, the tooth surface stresses match one another and offset each other. The tooth surface stresses are constant during one rotation of the outer gear F and one rotation of the carrier C along the outer gear F. As a result, fluctuations in the rotation speed of the output shaft are reduced.

Further, in the above description, the sun gear S is used for input, the outer gear F is fixed, and the carrier C is used for output. However, the configuration is not limited thereto. For example, the sun gear S may be fixed, the carrier C may be used for input, and the outer gear F may be used for output. Also in this case, if the pitch diameter of the sun gear S at the final stage is set larger than the pitch diameter of the other sun gear S, the load generated by the load torque and applied to the meshing portions of the sun gear and the planetary gears at the final stage can be reduced.

Further, as described above, the planetary gear reduction gear unit 80 of the present embodiment has two stages of planetary gear mechanisms. However, the planetary gear reduction gear unit 80 may have three or more stages of planetary gear mechanisms. Also in this case, if at least the pitch diameter of the sun gear S at the final stage is set larger than the pitch diameter of the sun gear S at the first stage, the sun gear and the planetary gears of the planetary gear mechanism at the final stage, which are subjected to the greatest load torque, can be extended in life.

Further, the above description is of an example in which the reduction gear unit 80 according to an embodiment of the present invention is applied to the photoconductor drive device 10 that drives and rotates the photoconductor drum 1 serving as an image carrying member. The reduction gear unit 80 according to an embodiment of the present invention is also applicable to a belt drive device that drives and rotates the intermediate transfer belt 5 serving as an image carrying member.

Figure 9:
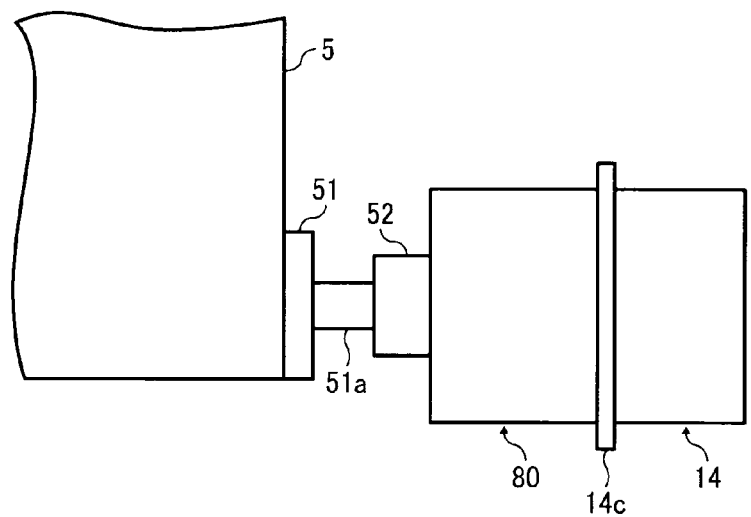
FIG. 9 is a schematic diagram illustrating a part of an intermediate transfer belt and a belt drive device provided with a reduction gear unit according to an embodiment of the present invention.

FIG. 9 is a schematic diagram illustrating a part of the intermediate transfer belt 5 and a belt drive device applied with the reduction gear unit 80 according to an embodiment of the present invention. The intermediate transfer belt 5 is stretched by the drive roller 51 and a plurality of other driven rollers and tension rollers. The rotation of the drive roller 51 is transmitted to the intermediate transfer belt 5 by friction generated between the drive roller 51 and the intermediate transfer belt 5 so that the intermediate transfer belt 5 is rotated. A drive roller shaft 51a provided to the drive roller 51 and a cylindrical shaft of the planetary gear reduction gear unit 80 are coupled together by the spline coupling 52, which is used in the above-described coupling to the photoconductor drum 1. By so doing, the rotation of the motor 14 is transmitted to the drive roller 51 with the rotation speed reduced by the planetary gear reduction gear unit 80.

As described above, the planetary gear reduction gear unit 80, which serves as the reduction gear unit according to the present embodiment, includes a plurality of stages of planetary gear mechanisms arranged in series in the axial direction thereof. Each of the planetary gear mechanisms includes the sun gear (e.g., the first sun gear 92 and the second sun gear 86), an outer gear (e.g., the outer gear 82), a plurality of planetary gears (e.g., the first planetary gears 83 and the second planetary gears 87), and a carrier (e.g., the first carrier 85 and the second carrier 89). The outer gear is arranged coaxially with the sun gear. The plurality of planetary gears are arranged between the outer gear and the sun gear at equal intervals in a circumferential direction thereof, and mesh with the sun gear and the outer gear. The carrier is rotatable coaxially with the sun gear and the outer gear to rotatably support the planetary gears. Further, the sun gear of the extreme downstream planetary gear mechanism, i.e., the planetary gear mechanism at the final stage located extreme downstream in the drive transmission direction has a larger pitch diameter than the sun gear of the any other planetary gear mechanisms.

With this configuration, as described above, the load generated by the load torque and applied to the meshing portions of the planetary gears and the sun gear at the final stage is reduced to be lower than in the configuration in which the pitch diameter of the sun gear at the final stage is set equal to the pitch diameter of the sun gear at the other stage. Consequently, the teeth of the sun gear and the planetary gears at the final stage are prevented from being worn out at a relatively early stage, and the sun gear and the planetary gears at the final stage are extended in life.

Further, the sun gear of the extreme upstream planetary gear mechanism, i.e., the planetary gear mechanism at the first stage located extreme upstream in the drive transmission direction is continuous with and formed directly from the drive shaft (e.g., the motor shaft 14a) of the drive source (e.g., the motor 14). It is therefore unnecessary to provide a separate sun gear for the first stage, and thus reduce the cost of the reduction gear unit. Further, with the outer gear (82) shared by the planetary gear mechanisms at the respective stages, the cost of the reduction gear unit is further reduced.

Further, if the components of the planetary gear mechanisms at the respective stages are made of a resin material, except for carrier pins (e.g., the first carrier pins 84 and the second carrier pins 88) serving as support shafts for supporting the planetary gears in the carriers at the respective stages, the components can be mass-produced by injection molding at relatively low cost. The components made of a resin material acquire a self-lubricating property. Further, the components made of resin produce lower noise when in use and are lighter in weight than components made of metal, and are improved in corrosion resistance. Further, the carrier pins made of metal are prevented from being deformed by a radial load for rotating the carriers, thereby maintaining favorable rotation transmission accuracy.

Further, the number of the planetary gears in the planetary gear mechanism at the final stage is set greater than the number of the planetary gears in the planetary gear mechanism at the other stage. Specifically, three planetary gears are provided in the planetary gear mechanism at the other stage, and four planetary gears are provided in the planetary gear mechanism at the final stage. The increase in the number of the planetary gears at the final stage results in a reduction in load generated by the load torque and applied to each of the planetary gears. Consequently, the planetary gears at the final stage are extended in life.

Further, the carrier of the planetary gear mechanism at each of the stages is rotatably floatingly supported in the outer gear fixing housing 81 serving as a casing. Therefore, even if there is a factor that may cause a rotation transmission error, such as eccentricity or an attachment error of the sun gear, eccentricity of the planetary gears, and an attachment error of the outer gear, the carrier and the planetary gears move in the radial direction. Consequently, the orbits of the planetary gears are self-aligned, and fluctuations in rotation are minimized.

Further, the planetary gear mechanism at each of the stages is configured such that the outer gear 82 is non-rotatable, and that the drive force is input to the sun gear and output to the carrier. By so doing, the rotation speed of the motor is reduced in the planetary gear mechanism at each of the stages, thereby obtaining a relatively high speed reduction ratio. Further, the cylindrical shaft 91 serving as an output shaft for outputting the drive force to the photoconductor drum 1 serving as a rotary member is fixedly mounted on the carrier of the planetary gear mechanism at the final stage. The sun gear of an adjacent planetary gear mechanism located downstream of the other planetary gear mechanism in the drive transmission direction is fixedly mounted on the carrier of any other planetary gear mechanism. With this configuration, the drive force output from the carrier of the other planetary gear mechanism is input to the sun gear of the adjacent planetary gear mechanism located closer to the photoconductor drum 1 than the other planetary gear mechanism.

Further, the sun gear of the planetary gear mechanism at the final stage has a larger pitch diameter than the diameter of the drum shaft 1b of the photoconductor 1, thereby reducing the load generated by the load torque and applied to the meshing portions of the planetary gears and the sun gear at the final stage.

Further, the cylindrical shaft 91 is fixedly mounted on the carrier of the planetary gear mechanism at the final stage and coupled to the drum shaft 1b of the photoconductor 1 by a splined coupling. Therefore, the cylindrical shaft 91 and the drum shaft 1b are coupled to and separated from each other simply by moving the photoconductor 1 serving as the rotary member in the axial direction. Accordingly, the coupling and separation of the cylindrical shaft 91 and the drum shaft 1b can be performed with relative ease.

Further, according to the present embodiment, the reduction gear unit 80 according to an embodiment of the present invention is used as a reduction gear unit of a drive device that drives a rotary member in an image forming apparatus, such as a copier, including the rotary member. With this configuration, fluctuations in rotation speed are reduced in the rotary member, such as a drive roller for driving an image carrying member such as the photoconductor drum 1 or a belt member such as the intermediate transfer belt 5 and a transfer belt, and a conveying roller for conveying a recording medium. Accordingly, a favorable image forming operation is performed.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A reduction gear unit, comprising:
    a casing; and
    a plurality of planetary gear mechanisms arranged in series in an axial direction thereof within the casing, each of the planetary gear mechanisms including:
        a sun gear;
        an outer gear arranged coaxially with the sun gear;
        a plurality of planetary gears arranged between the outer gear and the sun gear at equal intervals in a circumferential direction thereof and meshing with the sun gear and the outer gear; and
        a carrier rotatable coaxially with the sun gear and the outer gear to rotatably support the planetary gears,
    an extreme upstream planetary gear mechanism of the plurality of planetary gear mechanisms in a drive transmission direction including an input element connected to a drive source,
    an extreme downstream planetary gear mechanism of the plurality of planetary gear mechanisms in the drive transmission direction including an output element connected to a member to output the drive force to a rotary member,
    any planetary gear mechanism of the plurality of planetary gear mechanisms other than the extreme downstream planetary gear mechanism including an output element connected to an input element of an adjacent planetary gear mechanism located downstream of any planetary gear mechanism in the drive transmission direction,
    the sun gear of the extreme downstream planetary gear mechanism in the drive transmission direction having a larger pitch diameter than the sun gear of any other planetary gear mechanism, and
    the output element of the extreme downstream planetary gear mechanism is fixed to the carrier of the extreme downstream planetary gear mechanism, and the output element is rotatably unsupported by an axial end cap of the casing so that the carrier of the extreme downstream planetary gear mechanism is floatingly supported in the casing.

2. The reduction gear unit according to claim 1, wherein:
    the sun gear of the extreme upstream planetary gear mechanism in the drive transmission direction is continuous with and formed directly from a drive shaft of the drive source;
    the planetary gear mechanisms share a same outer gear; and
    each of the planetary gear mechanisms further comprises support shafts to support the planetary gears in the carrier that are made of metal.

3. The reduction gear unit according to claim 2, wherein components of the planetary gear mechanism other than the support shafts are made of resin.

4. The reduction gear unit according to claim 1, wherein a number of the planetary gears in the extreme downstream planetary gear mechanism in the drive transmission direction is greater than a number of the planetary gears in any other planetary gear mechanism.

5. The reduction gear unit according to claim 4, wherein the extreme downstream planetary gear mechanism has four planetary gears and any other planetary gear mechanism has three planetary gears.

6. The reduction gear unit according to claim 1, wherein the casing enables the carriers of the planetary gear mechanisms to float rotatably therewithin.

7. The reduction gear unit according to claim 1, wherein, in each of the planetary gear mechanisms, the outer gear is non-rotatable, and the drive force is input to the sun gear and output to the carrier.

8. The reduction gear unit according to claim 7, further comprising an output shaft to output the drive force to the rotary member,
    wherein the output shaft is fixedly mounted on the carrier of the extreme downstream planetary gear mechanism in the drive transmission direction, and the sun gear of an adjacent planetary gear mechanism located downstream of the any other planetary gear mechanism in the drive transmission direction is fixedly mounted on the carrier of the any other planetary gear mechanism.

9. The reduction gear unit according to claim 1, wherein the pitch diameter of the sun gear of the extreme downstream planetary gear mechanism in the drive transmission direction has a larger pitch diameter than a diameter of a shaft of the rotary member.

10. The reduction gear unit according to claim 1, further comprising an output shaft to output the drive force to the rotary member,
    wherein the output shaft is mounted on the carrier of the extreme downstream planetary gear mechanism in the drive transmission direction and coupled to a shaft of the rotary member by a splined coupling.

11. An image forming apparatus, comprising:
    the rotary member;
    the drive source to drive the rotary member; and
    the reduction gear unit according to claim 1 that transmits the rotational drive force of the drive source to the rotary member while reducing rotation speed of the drive source.

12. The image forming apparatus according to claim 11, wherein:
    the rotary member includes an image carrying member, and
    the reduction gear unit is used to drive the image carrying member.

13. The reduction gear unit according to claim 1, wherein the output element is a hollow structure fixed to and protruding from a side plate of the carrier of the extreme downstream planetary gear mechanism.

14. The reduction gear unit according to claim 13, wherein an inside of the hollow structure includes a gear that meshes with a gear on the member to output the drive force to the rotary member.

15. The reduction gear unit according to claim 1, wherein there is a clearance in a radial direction between the output element and an axial end cap of the casing so that the carrier of the extreme downstream planetary gear mechanism is floatingly supported in the casing.

16. The reduction gear unit according to claim 1, wherein the carriers of the planetary gear mechanisms are floatingly supported in the casing to provide self-alignment of orbits of the planetary gears of the planetary gear mechanisms.

17. The reduction gear unit according to claim 1, wherein at least one of the carriers of the planetary gear mechanisms includes two parallel side plates that sandwich the planetary gears of a respective one of the planetary gear mechanisms, and columns connecting the two parallel side plates and provided between the planetary gears of the respective one of the planetary gear mechanisms.

18. The reduction gear unit according to claim 17, wherein the at least one of the carriers of the planetary gear mechanisms includes pins that rotatably support the planetary gears of the respective one of the planetary gear mechanisms, and the pins are each connected between the two parallel side plates.

* * * * *